Oct. 14, 1969  S. ROSIN ETAL  3,472,577
WIDE ANGLE LONG EYE-RELIEF EYEPIECE
Filed March 4, 1966
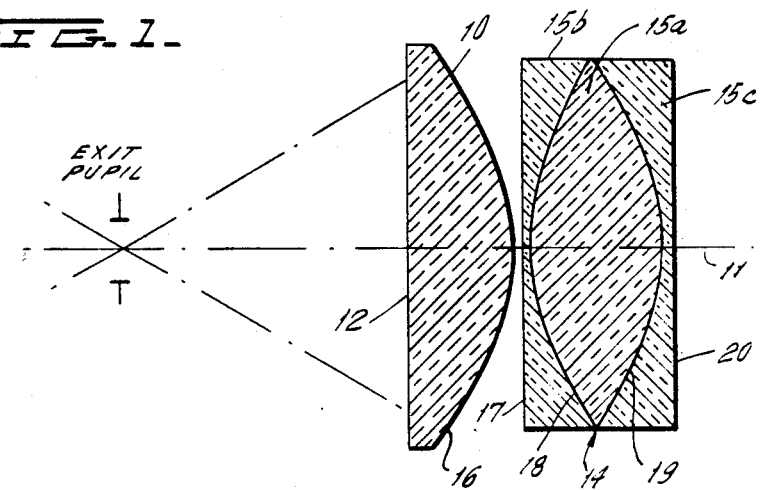
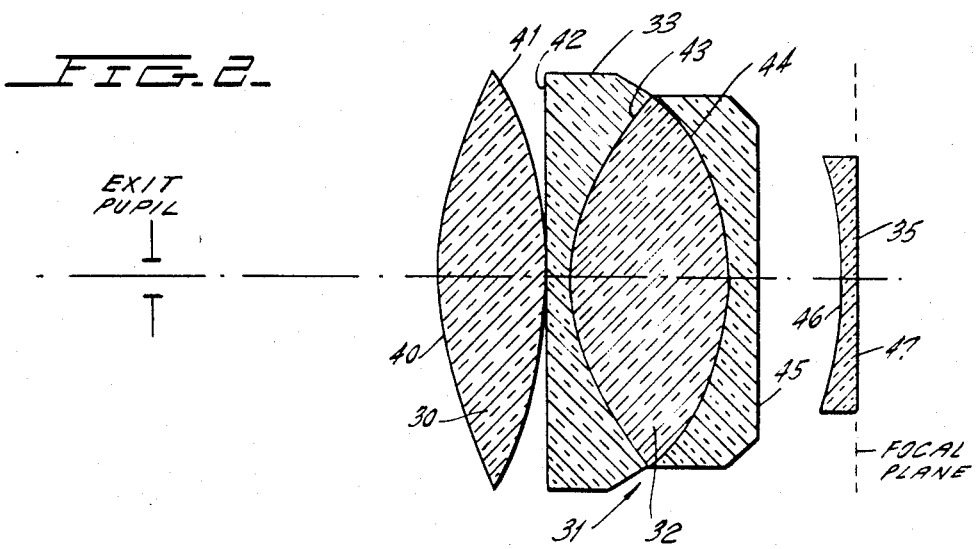
INVENTORS
SEYMOUR ROSIN
RUBIN GELLES
JUDAH EICHENTHAL
BY
OSTROLENK, FABER, GERB & SOFFEN
ATTORNEYS

United States Patent Office 3,472,577
Patented Oct. 14, 1969

3,472,577
WIDE ANGLE LONG EYE-RELIEF EYEPIECE
Seymour Rosin, Massapequa Park, Rubin Gelles, Far Rockaway, and Judah Eichenthal, Brooklyn, N.Y., assignors, by mesne assignments, to the United States of America as represented by the Administrator of the National Aeronautics and Space Administration
Filed Mar. 4, 1966, Ser. No. 532,006
Int. Cl. G02b 3/04, 13/18
U.S. Cl. 350—189                6 Claims

ABSTRACT OF THE DISCLOSURE

A wide angle, long eye-relief eyepiece having power, astigmatism, and coma corrections incorporated into a single element which is solely responsible for monochromatic performance and a zero power triplet correcting for lateral color abberation. The single element may be either plano-convex or double convex. Also, a negative field lens properly aspherized to eliminate spherical abberation may be included.

---

This invention relates to an eyepiece having wide angle application, and more particularly relates to a novel wide angle eyepiece which has a relatively long eye-relief or greater than normal eye clearance from the final lens of the eyepiece wherein substantially all power, astigmatism and coma corrections are incorporated into a single element which is solely responsible for the monochromatic performance of the eyepiece, while a zero power triplet corrects for lateral color aberration.

Many applications of optical instruments require a relatively long eye-relief distance so that the eye can be placed at a distance somewhat greater from the final lens of the eyepiece than usual. In particular, various visual instruments used in spacecraft, such as the Apollo spacecraft, have need for eyepieces with longer than usual eye-relief and relatively short axial length because of its unusual environmental condition. In the design of eyepieces, the aberrations of major concern are astigmatism and lateral color. The next aberration of consequence is coma with its degree of correction determining the maximum usable exit pupil areas. Spherical and axial color aberrations are relatively unimportant and may be handled by minor adjustments in the remainder of the optical system. Petzval curvature and distortion aberrations are generally accepted without attempts to correct these aberrations.

Wide angle eyepieces are known to the art, and are generally designed to incorporate a close grouping of highly convergent elements with deep curves required for color correction. The amount of axial distance occupied by the glass, however, makes it difficult to shift the principal planes back far enough toward the eye to obtain longer than usual eye clearance without running into severe lens curvatures at the same time.

The principle of the present invention is to construct a wide angle eyepiece which also provides a relatively large eye clearance by using a single element for the provision of power, astigmatism and coma correction so that this single element completely controls the monochromatic performance of the eyepiece. The principal points of the eyepiece are then identical with those of this element which is the one nearest the eye. Lateral color corrections are then accomplished in a zero power grouping located between this lens and the focal plane.

The means by which this is accomplished is to construct at least one of the surfaces of this lens of a strongly non-spherical form and to choose the coefficients of this surface so as to control the astigmatic curves. This process may best be described in lay terms as molding the surface deliberately to achieve the desired results, using normal ray trace methods to arrive at the solution.

Mathematically, the procedure is as follows: The surface may be described by the equation $$x = \frac{y^2}{r + (r_2 - y_2)^{1/2}} + by^4 + cy^6 + dy^8 + \ldots \quad (1)$$

where $r$ is the radius of curvature at the axis of the surface. The process involves variation of the constants $b$, $c$, $d$, etc. until the $s$ and $t$ astigmatic curves are where desired.

While the eyepiece lens may be a plano-convex lens with the aspheric correction incorporated into the convex surface, it is also possible to use a two-surface convex lens with the power shared between the two surfaces and the aspheric correction applied to either of the surfaces. Thus, an additional degree of freedom is made available for aberration correction. In addition, a negative field lens which is properly aspherized to eliminate spherical aberration of the exit pupil may be additionally incorporated into the eyepiece.

Accordingly, a primary object of this invention is to provide a novel wide angle eyepiece which has a field of view of at least 60°.

Another object of this invention is to provide a novel wide angle eyepiece which has a relatively long eye-relief distance.

Yet another object of this invention is to provide a novel wide angle eyepiece wherein all of the power, astigmatism and coma corrections are incorporated into a single element which is solely responsible for monochromatic performance of the eyepiece while lateral color corrections are obtained from a zero power grouping which could take the form of a triplet lens.

These and other objects of this invention will become apparent when reading the following description and accompanying drawings, in which:

FIGURE 1 is a side cross-sectional view taken through the optical axis of an eyepiece constructed in accordance with the invention.

FIGURE 2 is a view similar to FIGURE 1 which shows a second embodiment of the invention.

Referring first to FIGURE 1, there is illustrated therein a first embodiment of the present invention incorporating a plano-convex lens 10 having an optical axis 11, with the planar surface 12 of lens 10 facing the exit pupil 13. Note that the spacing from surface 12 to exit pupil 13 is approximately 2 3/16 inches which exceeds the 2 inch focal length of the eyepiece. A triple lens 14 composed of a convex lens 15a in surface-to-surface contact with plano-concave lens 15b and 15c is then spaced from lens 10 to complete the long eye-relief system.

The following Table 1 defines lens curvatures and other lens details for the system of FIGURE 1 in terms of surfaces 12, 16, 17, 18, 19 and 20 where all units are in millimeters:

TABLE 1

| Surface | Radius | Free aperture | Separation | Glass |
|---|---|---|---|---|
| 12 | ∞ | 68 | 22.0 | LaK17 788504 |
| 16 | −40.00 | 76 | 1.0 | |
| 17 | Plano | 70 | 2.0 | SF11 784257 |
| 18 | 60.00 | 70 | 26.0 | LaK17 788504 |
| 19 | 60.00 | 68 | 2.0 | SF11 784257 |
| 20 | Plano | 66 | | | where E.F.=50.47; B.F.=32.73; pupil=57.15

In the specific design in accordance with the invention, surface 16 is preferably designed to have an aspheric surface rather than the spherical surface indicated in Table 1 in order to prevent a severe breakdown of the astigmatic surfaces. In particular, a third order analysis for a flat tangential field indicates that the surface 16 should follow the following equation:

$$x = -1.25 \times 10^{-2} y^2 + 9.147 \times 10^{-7} y^4 \qquad (2)$$

The surface configuration of surface 16 could vary from that of Equation 2 since a ray trace of Equation 2 shows an aspheric surface breakdown somewhat beyond ½ the field of view. Thus, the surface 16 could be further modified by the addition of another term as follows:

$$x = -1.25 \times 10^{-2} y^2 + 9.147 \times 10^{-7} y^4 - 1.75 \times 10^{-10} y^6 \qquad (3)$$

This modification will keep the astigmatic surfaces under control over the full 60° field of view. The zero power triplet 14 of FIGURE 1 provides very good control for the lateral color aberration with this aberration being considerably less than that found with conventional eyepieces. The distortion will be moderate and opposite to that usually experienced with a conventional eyepiece and will be barrel shaped at the eye rather than the usual pincushion shape. It should, however, be noted that other triplet lens forms or groupings could be used where the group will have substantially zero power. Thus, the group could take the form of a central concave lens interposed between two convex lenses; and could further include two doublets, serving as a triplet in various orientations with respect to one another.

The major drawback with the design of FIGURE 1 incorporating Equation 3 for the surface 16 is that coma correction is limited so that the exit pupil 13 should be restricted to 5 millimeters or less. However, coma correction can be considerably improved by modifying the aspheric trace of Equation 3, particularly by slightly lowering the absolute values of the $y^4$ power and $y^6$ power coefficients.

In FIGURE 1, lens 10 is shown as a plano-convex lens. FIGURE 2 illustrates a modification of the eyepiece of FIGURE 1 wherein a convex lens replaces lens 10 of FIGURE 1 and a negative field lens properly aspherized is added to eliminate spherical aberration at the exit pupil.

Referring now to FIGURE 2 and as mentioned above, the main eyepiece lens is lens 30 which is convex at both sides. A modified triplet 31 replaces the triplet 14 and is composed of convex lens 32 faced on either side by plano-concave lenses 33 and 34. In order to correct for spherical aberration at the exit pupil for the complete instrument, a negative field lens 35 is provided in the manner described in U.S. Patent 2,588,414 in the name of Rosin.

The constants used in the system of FIGURE 2 are listed in the following Table 2 which lists the constants for surfaces 40, 41, 42, 43, 44, 45, 46 and 47:

TABLE 2

| Surface | Radius | Free Aperture | Separation | Glass |
|---|---|---|---|---|
| 40 | 60.64 | 80 | 22.4 | LaK17 788504 |
| 41 | −99.15 | 85 | .3 | |
| 42 | Plano | 77 | 5.1 | SF11 784257 |
| 43 | 52.59 | 70 | 31.8 | LaK17 788504 |
| 44 | −52.59 | 67 | 5.1 | SF11 784257 |
| 45 | Plano | 60 | 16.3 | |
| 46 | −300.14 | 49 | 3.9 | ZK7 508611 |
| 47 | Plano | 48 | | | where E.F. = 51.09; B.F. = 18.93; pupil = −57.15

As previously pointed out, the desired aspheric correction previously applied to surface 16 in FIGURE 1 can now be applied to either of surfaces 40 or 41 of lens 30 so that the power of lens 30 is shared between two surfaces 40 and 41. The two convex surfaces 40 and 41 further provide an additional degree of freedom for making the aberration correction.

In FIGURE 2, surface 40 has been selected to receive the aspheric correction curvature, which is defined as follows:

$$x = 8.2453 \times 10^{-3} y^2 - 8.0624 \times 10^{-7} y^4 + 1.9744 \times 10^{-11} y^6 - 9.2216 \times 10^{-16} y^8 \qquad (4)$$

In addition, surface 46 is also aspherized and follows a curvature identified as follows:

$$x = -1.6659 \times 10^{-3} y^2 - 4.2040 \times 10^{-6} y^4 - 4.7293 \times 10^{-10} y^6 \qquad (5)$$

The lens of FIGURE 2 is an eyepiece used with a 1× telescope having a field of view of 60°. Note that the surface 47 lies in the focal plane.

Calculations show that the image is excellent over a relative aperture of F:4 or more. Moreover, the optical quality and surface accuracy of the lenses is about that of spectacle lenses so that standard manufacturing techniques can be used.

We claim:
1. A wide angle, long eye-relief eyepiece comprising a first lens having at least a first convex surface; a substantially zero power lens grouping spaced from said first lens and having an optical axis coaxial with the optical axis of said first lens; an exit pupil; said convex lens interposed between said exit pupil and said zero power lens grouping; the surface of said first lens facing said exit pupil spaced from said exit pupil by greater than three-fourths of the focal length of said first lens; said first lens having a focal length of approximately two inches and the convex surface being aspheric and having the general equation of:

$$x = -1.25 \times 10^{-2} y^2 + 9.147 \times 10^{-7} y^4$$

2. The device as set forth in claim 1 which includes a negative field lens spaced from said zero power lens grouping facing the side of said zero power lens grouping away from said first lens.

3. The device as set forth in claim 1 wherein said first lens is a plano-convex lens.

4. The device as set forth in claim 1 wherein said aspheric surface has the general equation:

$$x = -1.25 \times 10^{-2} y^2 + 9.147 \times 10^{-7} y^4 - 1.75 \times 10^{-10} y^6$$

5. A wide angle, long eye-relief eyepiece comprising a first lens having at least a first convex surface; a substantially zero power lens grouping spaced from said first lens and having an optical axis coaxial with the optical axis of said first lens; an exit pupil; said convex lens interposed between said exit pupil and said zero power lens grouping; the surface of said first lens facing said exit pupil spaced from said exit pupil by greater than three-fourths of the focal length of said first lens; said first lens having a focal length of approximately two inches and the convex surface being aspheric and having the general equation of:

$$x = 8.2453 \times 10^{-3} y^2 - 8.0624 \times 10^{-7} y^4 + 1.9744 \times 10^{-11} y^6 - 9.2216 \times 10^{-16} y^8$$

where $x$ and $y$ define a tangential field.

6. The device as set forth in claim 5 which includes a negative field lens spaced from said zero power lens grouping away from said first lens; said negative field lens having an aspheric surface generally following the equation:

$$x = 1.6659 \times 10^{-3} y^2 - 4.2040 \times 10^{-6} y^4 - 4.7293 \times 10^{-10} y^6$$

References Cited

UNITED STATES PATENTS 1,968,222  7/1934  Richter.
2,719,457  10/1955  Tripp _____ 350—24

JOHN K. CORBIN, Primary Examiner

U.S. Cl. X.R.
350—225, 230, 234